(12) United States Patent
Zhang et al.

(10) Patent No.: US 11,907,069 B2
(45) Date of Patent: Feb. 20, 2024

(54) DYNAMIC RETRIEVAL OF REGION CODE FOR NETWORK DEVICES ON DATA COMMUNICATION NETWORKS

(71) Applicant: Fortinet, Inc., Sunnyvale, CA (US)

(72) Inventors: Yong Zhang, Belmont, CA (US); Peter Yongchun Liu, Saratoga, CA (US); Koroush Akhavan-Saraf, San Jose, CA (US); Xin Wang, San Jose, CA (US); Andrew Q Ji, Palo Alto, CA (US); Ben Wilson, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 265 days.

(21) Appl. No.: 17/116,989

(22) Filed: Dec. 9, 2020

(65) Prior Publication Data

US 2022/0179926 A1    Jun. 9, 2022

(51) Int. Cl.
*G06F 11/14* (2006.01)
*G06F 9/4401* (2018.01)
*H04W 4/029* (2018.01)
*H04W 24/02* (2009.01)
*G06F 21/10* (2013.01)

(52) U.S. Cl.
CPC ........ *G06F 11/1417* (2013.01); *G06F 9/4401* (2013.01); *H04W 4/029* (2018.02); *H04W 24/02* (2013.01); *G06F 21/10* (2013.01); *G06F 21/1013* (2023.08)

(58) Field of Classification Search
CPC .... G06F 11/1417; G06F 9/4401; G06F 21/10; G06F 2221/0708; H04W 4/029; H04W 24/02
See application file for complete search history.

(56) References Cited

U.S. PATENT DOCUMENTS

| 2016/0036634 A1* | 2/2016 | PalChaudhuri | ..... H04L 41/0809 709/221 |
| 2016/0191715 A1* | 6/2016 | Mohammed | .......... H04M 15/70 455/406 |

* cited by examiner

*Primary Examiner* — Zhitong Chen
(74) *Attorney, Agent, or Firm* — Law Office of Dorian Cartwright; Dorian Cartwright (57) ABSTRACT

In network devices, during manufacturing, input for designation of a region code to be a non-specific region code is stored in a BIOS memory of the network device, and a specific region code is stored off the BIOS. During boot up, the BIOS is checked for a specific region code to regulate wireless transmissions at a physical location of operation. Responsive to receiving the non-specific region code from BIOS, the specific region code is requested from a region code server based on a network device identifier. Once received, the region code is stored in flash memory, until rebooted or otherwise reset, rather than BIOS.

10 Claims, 5 Drawing Sheets

DYNAMIC RETRIEVAL OF REGION CODE FOR NETWORK DEVICES ON DATA COMMUNICATION NETWORKS

FIELD OF THE INVENTION

The invention relates generally to computer networking, and more specifically, to dynamic retrieval of region codes for network devices on data communication networks.

BACKGROUND

Wireless network devices are increasing in numbers all over the world. However, different countries and regions apply different regulations to allowable wireless channel transmissions for Wi-Fi and other untethered communication. Region codes can define sub-bands of spectrum, channel numbers, allowed users, and power levels, for instance. For example, the United States through the FCC began requiring that devices operating in the bands of 5.250-5.350 GHz and 5.470-5.725 GHz employ dynamic frequency selection (DFS) and transmit power control (TPC) capabilities. Because of these variations between regions, network devices are manufactured without being configured for a particular country or region of operation. Currently, during regional conversion processes, a region code is saved in the BIOS and read at boot up for proper regional configuration.

Problematically, the cost is high for regional conversion processes of network devices. Once a country or regional destination is determined for network devices, they have to be unpacked from an initial manufacturing state. The network devices are programmed with an appropriate license stored in a basic input/output system (BIOS) to ensure operability at a destination. BIOS operations can be risky and lead to hardware damage. They are then repackaged for distribution to the region. The time and human labor add additional manufacturing expense.

Hard-coded region codes also make it difficult to move network devices to different countries or regions after manufacture. Updating the region codes in BIOS brings on the same difficulties as the initial regional conversion process.

What is needed is a robust technique for dynamic retrieval of region codes for network devices on data communication networks to eliminate static, manual regional conversion processes.

SUMMARY

To meet the above-described needs, methods, computer program products, and systems for dynamic retrieval of region codes for network devices on data communication networks to eliminate static, manual regional conversion processes.

In one embodiment, during manufacturing, a non-specific region code is stored in a BIOS memory of the network device. A specific region code is stored off the BIOS memory in association with a network device identifier. During boot up, the BIOS is checked for the specific region code to regulate wireless transmissions at a physical location of operation. Responsive to receiving the non-specific region code from BIOS, the specific region code is requested from a region code server using the network device identifier.

In another embodiment, a license is validated for the physical location of operation received from the region code server. The specific region code of the license is stored in a flash memory of the network device, until rebooted or otherwise reset. Ultimately, wireless transmissions are conducted according to parameters of the license.

Advantageously, computer manufacturing is less complex and less costly. Furthermore, potential damage to the BIOS avoided.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for dynamic retrieval of region codes for network devices on data communication networks.

Figure 1:
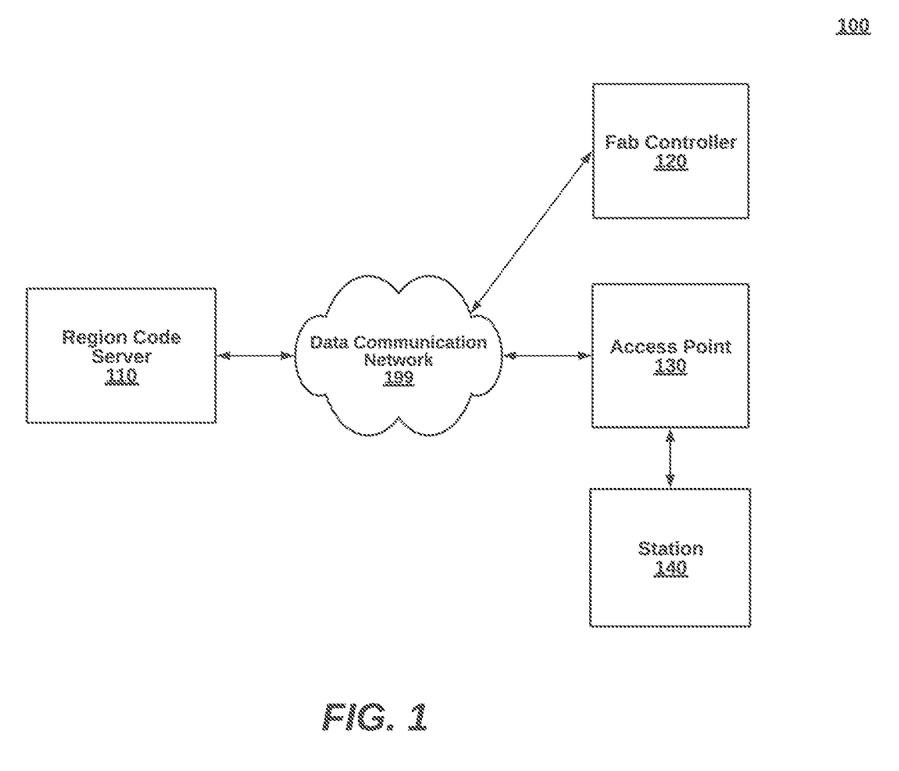
FIG. 1 is a high-level block diagram illustrating a system for dynamic retrieval of region codes for network devices on data communication networks, according to one embodiment.
Figure 2:
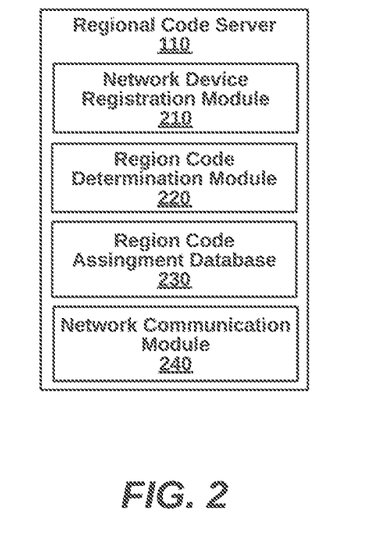
FIG. 2 is a more detailed block diagram illustrating a region code server of the system of FIG. 1, according to one embodiment.

Systems for Dynamically Retrieved Region Codes (FIGS. 1-2)

FIG. 1 is a high-level block diagram illustrating a system 100 for dynamic retrieval of region codes for network devices on data communication networks, according to one embodiment. The system 100 includes a region code server 110, a fab controller 120, an access point 130, and a station, within network infrastructure for a data communication system 101. Many other embodiments of the system 100 besides the present use case are possible. Component can be electrically coupled or otherwise coupled in data communication. Moreover, the region code server 110 typically includes additional functionality depending on its role within the network architecture. For example, a firewall performs deep packet inspection for identifying malicious packets. In another example, an access point manages Wi-Fi stations and communicates with other access points and can be managed by Wi-Fi controllers. The components can be implemented in hardware, software, or a combination of both, such as the general computing environment illustrated in FIG. 5.

The network device 110 receives input data packets 101 for processing from the data communication system 101 at a network interface and transmits output data packets 103 after processing. The network device 110 can be an access point, a gateway, a router, a switch, a firewall, a Wi-Fi controller, or any other network appliance that processes network traffic. For example, an access point can receive a session of data packets from a wireless station on a Wi-Fi portion of the data communication system 101 and process for transmission on to a remote server on a WAN portion of the data communication system 101, based on packet processing. In another example, a firewall can receive a session of data packets headed inbound to a Wi-Fi portion of the data communication network 101 and process for application of Wi-Fi or enterprise network policies.

The region code server 110 manages distribution of licenses for the access point 130 according to a physical location of operation. In other embodiments, other network devices are also managed, such as routers, switches, Wi-Fi controllers, repeaters, and stations. An acronym or numerical code can be sent for configuration or actual regional parameters can be sent. In operation, registered network devices access region codes during boot up or reset. An entity controlling the region code server 110 can provide outsourced management service of dynamic updates for several different manufacturers.

Updates to a physical location of operation can also be managed by the region code server 110, in an embodiment.

The fab controller 120 sets the BIOS of network devices to be an indication that a dynamic country code needs to be retrieved. An asterisk or any other symbol or code can be stored in BIOS for this purpose. In addition, the fab controller 120 synchs the system 100 by setting up records for network devices on the region code server 110, before, during, or after manufacture. A serial number, MAC number or other identifier is stored in a record. A country can be designated at the same time, or later, or even updated after an initial designation. In one instance, a manufacturing entity controls the fab controller 120 while an independent, third-party controls the region code server 110.

The access point 130 (e.g., FORTIAP wireless access points) programs a region code assigned by the region code server 110, in situ, during boot up or factory reset. In response to the indication set during manufacture, the access point queries the region code sever 110 for a region code. The code is received and stored in flash memory for access by the operating system and hardware in complying with regional requirements. This can occur prior to full boot up or afterwards. One implementation of the access point 130 self-determines location using a GPS or other location technology, and then request the specific country code based on the coordinates. In still another implementation, the access point 130 can poll neighboring access points for country codes.

The station 140 can set a region code on the fly during boot up or factory reset. For example, the station 140 can be registered with the access point 130 which provides a country code for the station 140. In one case, the station 140 is tracked by a Wi-Fi controller while being handed-off to different access points manage by the same Wi-Fi controller. As a result, country code information can be provided from any of the access points around an enterprise network.

FIG. 2 is a more detailed block diagram illustrating the region code server 110 of the system of FIG. 1, according to one embodiment. The region code server 110 includes a network device registration module 110, a network device registration module 210, a region code determination module 220, a region code assignment database 230, and a network communication module 240. The component functionalities can be implemented in hardware, microcode, high level software code, or a combination.

The network device registration module 210 tracks newly manufactured devices through boot ups, resets, and moves to new locations. Network devices can be booted up during testing and verifications. An intermediate site may receive network devices as OEM and then be customized for installation at a customer site. Each time network devices boot up, the location may be different, and sometimes the region code may be different after being transported through a distribution chain.

The region code determination module 220 responds to requests for region codes from network devices. An identifier is indexed to find a corresponding assignment. In some cases, region codes have to be predicted, for example, based on location. A relational table correlates location to region codes in order to identify a region code for a specific location associated with a network device.

The region code assignment database 230 stores the records. A record is created at manufacture that can be manually or programmatically updated. For some entries, no code has been designated. An example partial set of country codes is shown in Table 1, wherein US is the country code for the United States, CA is the country code for Canada, JP3 is the country code for Japan, and so on. Region codes include country codes but could also include territories, parts of countries (e.g., a few cities), clusters of countries, continents, or the like.

TABLE 1

| Country Codes | |
| --- | --- |
| Code | Country Name |
| US | United States |
| CA | Canada |
| JP3 | Japan |
| DE | Germany |
| NL | Netherlands |
| IT | Italy |
| PT | Portugal |
| LU | Luxembourg |
| NO | Norway |
| FI | Finland |
| DK | Denmark |

The network communication module 240 includes hardware and software necessary for data communication over a physical channel. For example, transceivers, antennae, input/output ports, IEEE 802.3 and IEEE 802.11 modules, and the like.

Figure 3:
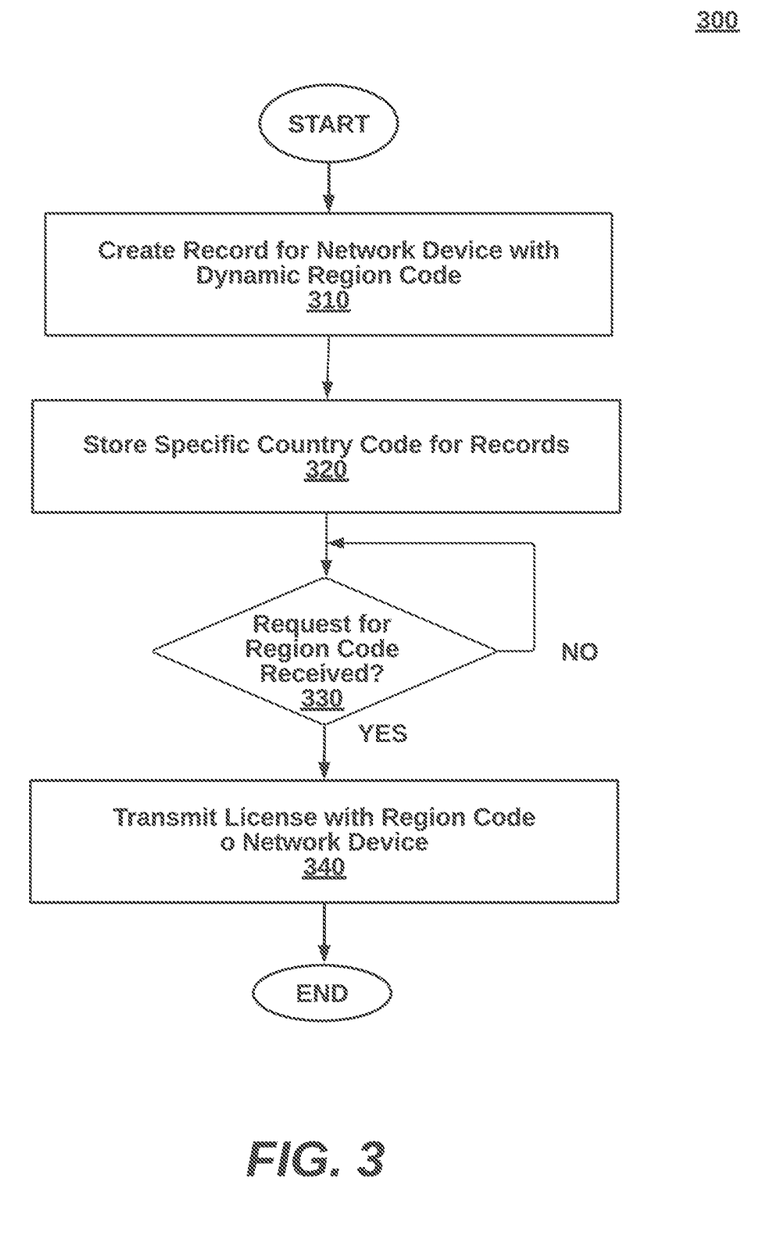
FIG. 3 is a high-level flow diagram illustrating a method for dynamic region code retrieval, from the perspective of a region code server, according to one embodiment.
Figure 4:
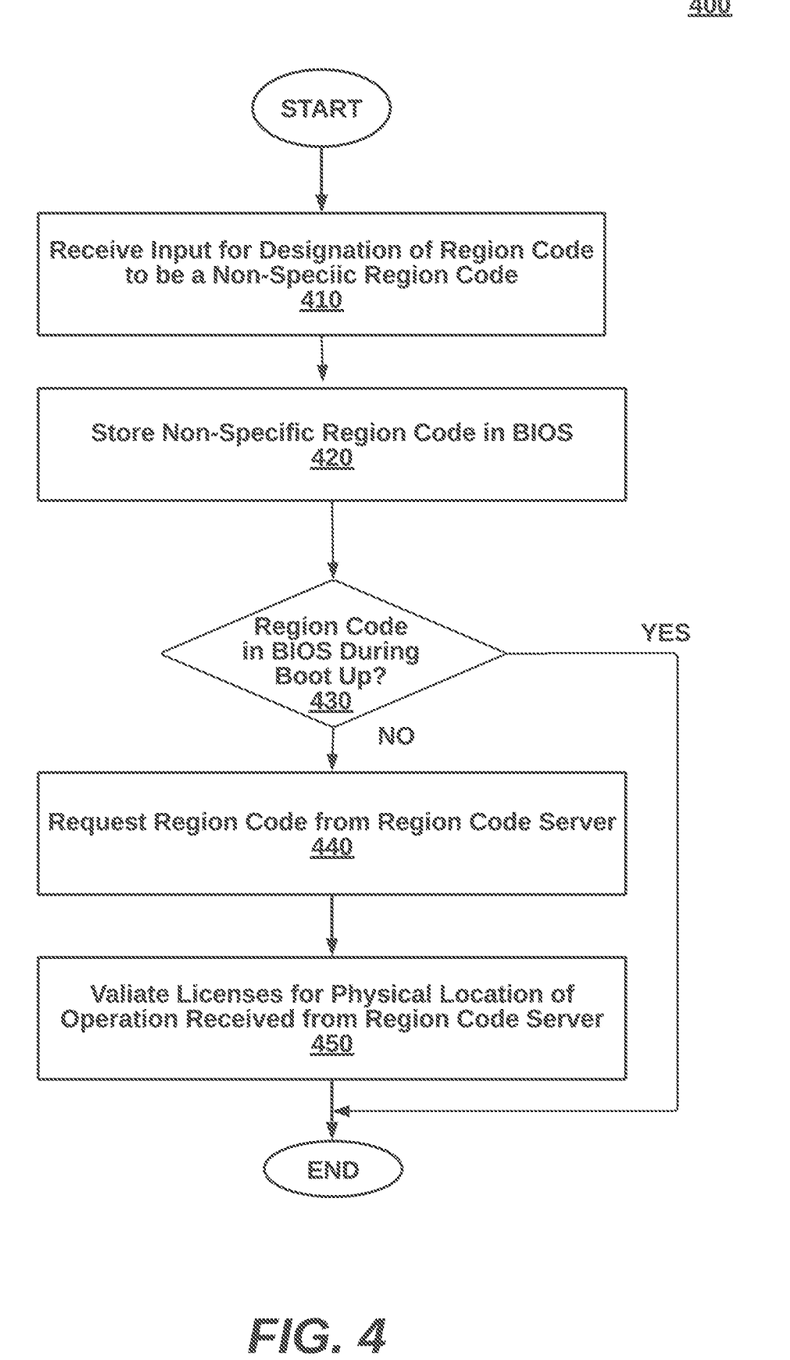
FIG. 4 is a high-level flow diagram illustrating a method for dynamic region code retrieval, from the perspective of a region code server, according to one embodiment.

Methods for Dynamically Retrieved Region Codes (FIG. 3-4)

FIG. 3 is a high-level flow diagram illustrating a method 300 for dynamic region code retrieval, from the perspective of a region code server, according to one embodiment. The method 300 can be implemented, for example, by the region code sever 110 of FIG. 1. Many variations are possible. The steps of the method can be performed as shown or in different orders, with additional steps included, over various embodiments.

At step 310, records are created for network devices having dynamic region codes. At the same time or later, at step 320, a specific country code is stored. In one example, country codes are selected through a user interface for storage in the record.

At step 330, responsive to a request from the network device at boot up or reset, a country code is requested. The country code is retrieved and transmitted to the network device, at step 340.

FIG. 4 is a high-level flow diagram illustrating a method 400 for dynamic region code retrieval, from the perspective of an access point, according to one embodiment. The method 400 can be implemented by, for example, the access point 120 of FIG. 1. At step 410, during manufacturing, input is received for designation of a region code to be a non-specific region code. At step 420, the non-specific region code is stored in a BIOS memory of the network device. The non-specific region code indicates to other processes that a dynamic region code is needed.

At step 430, during boot up, the BIOS is checked for a specific region code to regulate wireless transmissions at a physical location of operation. Responsive to receiving the non-specific region code from BIOS, a specific region code is requested from a region code server based on a network device identifier, at step 440. To do so, an IP address of a region code server is stored in the BIOS or elsewhere. In some alternatives, the region code is retrieved from the region code server initially, but is then stored locally (e.g., in a thumb drive). On the other hand if, at step 430, a specific region code from BIOS is received, then the remaining steps are bypassed. One alternative retrieves the specific region code to a thumbdrive or other nonvolatile memory, preferably during boot up or soon afterwards.

At step 450, a license is validated for the physical location of operation received from the region code server. At step 360, the specific region code of the license is stored in a flash memory of the network device. At step 560, wireless transmissions are conducted according to parameters of the license.

Figure 5:
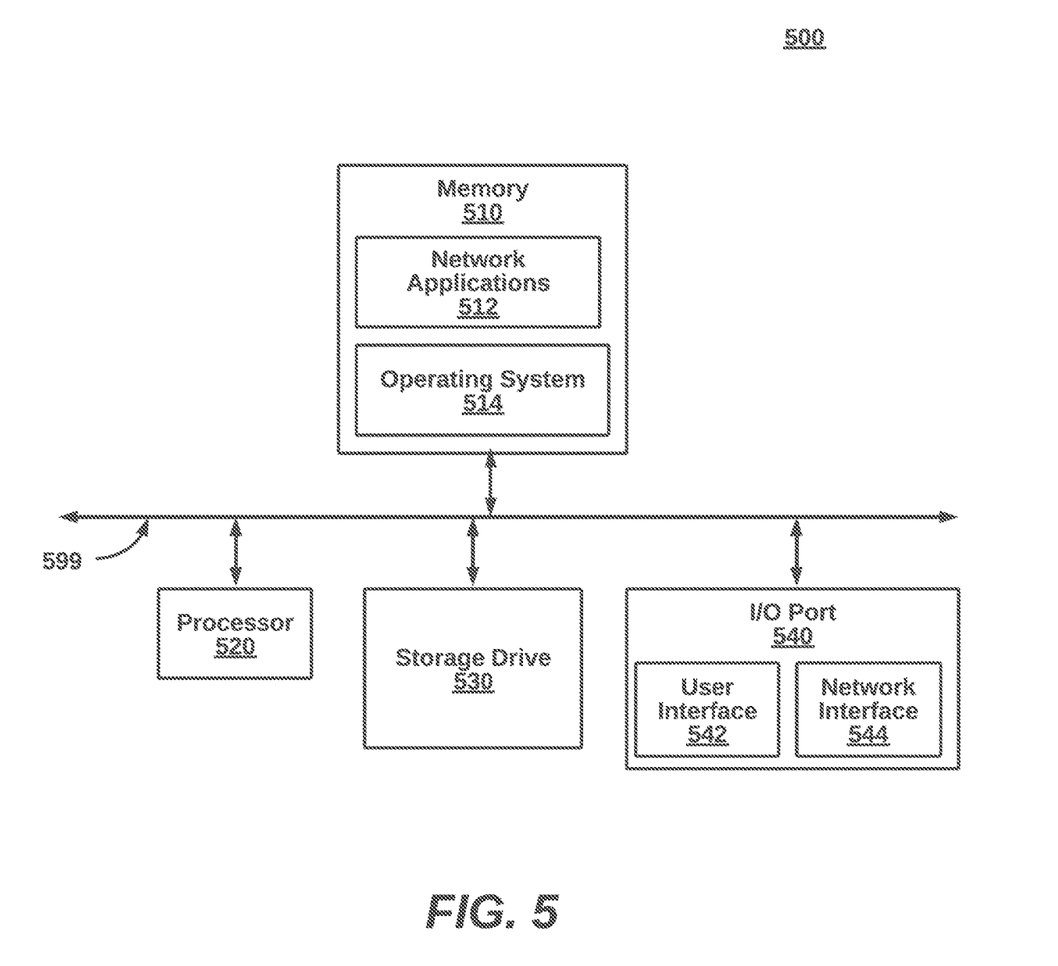
FIG. 5 is a block diagram illustrating an example computing device, according to one embodiment.

Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, such as the region code server 110, fab controller 120, access point 130, and station 140. Additionally, the computing device 500 is merely an example implementation itself, since the system 100 can also be fully or partially implemented with laptop computers, tablet computers, smart phones, Internet appliances, and the like.

The computing device 500, of the present embodiment, includes a memory 510, a processor 520, a hard drive 530, and an I/O port 540. Each of the components is coupled for electronic communication via a bus 599. Communication can be digital and/or analog, and use any suitable protocol.

The memory 510 further comprises network applications 512 and an operating system 514. The network applications 520 can include the modules of network applications. Other network applications can include 512 a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The hard drive 530 can be any non-volatile type of storage device such as a magnetic disc, EEPROM, Flash, or the like. The hard device 530 stores code and data for applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A network device for wireless transmissions, implemented at least partially in hardware and coupled in communication with a data communication network, for dynamic retrieval of region codes for network devices on data communication networks, the network device comprising:
    a basic input/output system (BIOS) memory to, during manufacturing, receive input for designation of a region code to be a non-specific region code, wherein the BIOS memory to store the non-specific region code in a BIOS memory of the network device, and wherein during boot up, the BIOS is checked for a specific region code to regulate wireless transmissions at a physical location of operation;
    a network communication interface, coupled to the BIOS memory, and responsive to receiving the non-specific region code from BIOS, to request a specific region code from a region code server based on a network device identifier, wherein the network communication interface receives response form the region code server including a license;
    a processor, coupled to the network communication interface, to validate a license for the physical location of operation received from the region code server; and
    a flash memory, coupled to the processor, to store the specific region code of the license in a flash memory of the network device,
    wherein the network communication interface conducts wireless transmissions according to parameters of the license.

2. The network device of claim 1, further comprising:
    a GPS module to determine the physical location of operation at boot up,
    wherein the region code is requested from the region code server based on a network device identifier comprises requesting the region code from the region code server based on the network device identifier and the physical location of operation.

3. The network device of claim 2, wherein the GPS module detects a second physical location of operation at boot up does not match the specific region code and is distinct form the physical location of operation, wherein responsive to detecting the second physical location of operation, the network device requests a second specific region code from the region code server based on the network device identifier and the second physical location of operation.

4. The network device of claim 1, wherein the flash memory, during a reset to factory settings, erases the specific region code from the flash memory, and wherein a second specific region code is requested from the region code server.

5. The network device of claim 4, wherein the physical location of operation has changed and the second region code is distinct from the region code.

6. The network device of claim 1, wherein the network device comprises an access point.

7. The network device of claim 1, wherein the processor, responsive to receiving the specific region code from BIOS, suppresses a request for the specific region code from the region code server.

8. The network device of claim 1, wherein the processor polls at least one nearby access point for region code configuration, wherein the processor, responsive to the region code configuration not matching the specific region code, sends an alert.

9. A computer-implemented method in a network device for wireless transmissions, implemented at least partially in hardware and coupled in communication with a data communication network, for dynamic retrieval of region codes for network devices on data communication networks, the method comprising:
    during manufacturing, receiving input for designation of a region code to be a non-specific region code;
    storing the non-specific region code in a basic input/output system (BIOS) memory of the network device;
    during boot up, checking the BIOS for a specific region code to regulate wireless transmissions at a physical location of operation;
    responsive to receiving the non-specific region code from BIOS, requesting a specific region code from a region code server based on a network device identifier;
    validating a license for the physical location of operation received from the region code server;
    storing the specific region code of the license in a flash memory of the network device; and
    conducting wireless transmissions according to parameters of the license.

10. A non-transitory media storing computer source code to, when executed by a processor, perform a method in a network device for wireless transmissions, implemented at least partially in hardware and coupled in communication with a data communication network, for dynamic retrieval of region codes for network devices on data communication networks, the method comprising:
  during manufacturing, receiving input for designation of a region code to be a non-specific region code;
  storing the non-specific region code in a basic input/output system (BIOS) memory of the network device;
  during boot up, checking the BIOS for a specific region code to regulate wireless transmissions at a physical location of operation;
  responsive to receiving the non-specific region code from BIOS, requesting a specific region code from a region code server based on a network device identifier;
  validating a license for the physical location of operation received from the region code server;
  storing the specific region code of the license in a flash memory of the network device; and
  conducting wireless transmissions according to parameters of the license.

* * * * *